INVENTOR
Floris Koppelmann

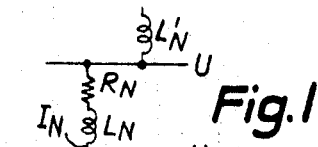
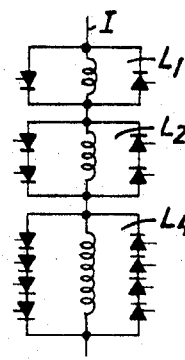
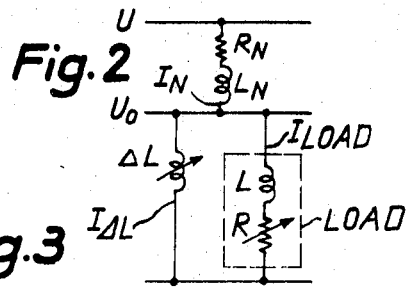
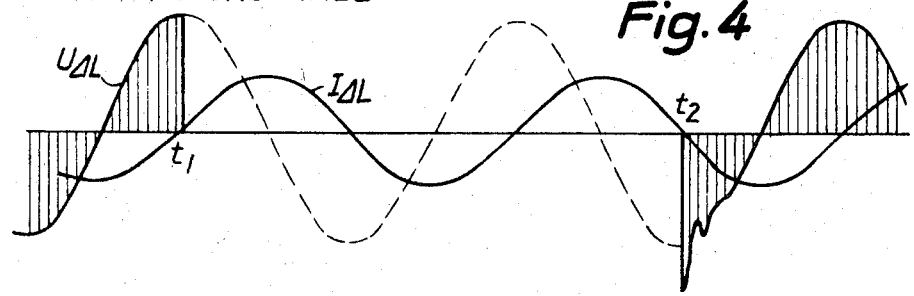
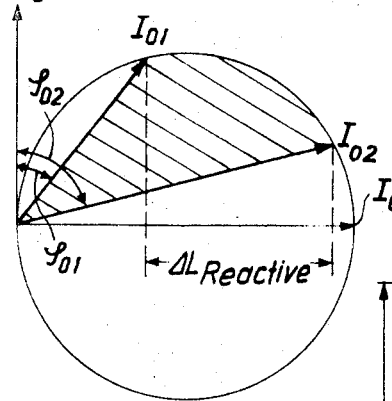
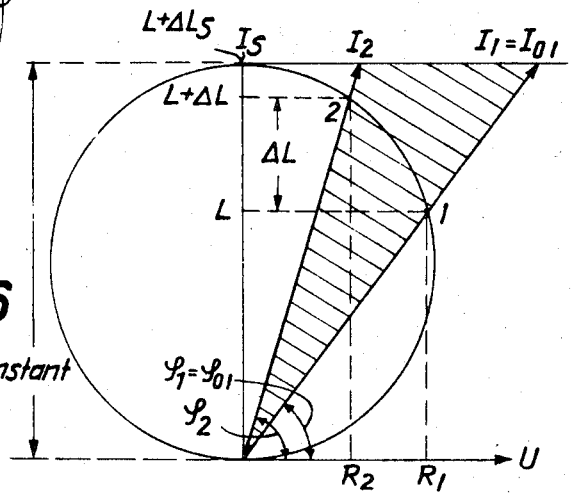
INVENTOR
Floris Koppelmann Dec. 29, 1970　　　F. KOPPELMANN　　　3,551,799
MAINS VOLTAGE STABILIZING APPARATUS PROVIDING
CONSTANT REACTIVE CURRENT
Filed March 24, 1969　　　　　　　　　　　2 Sheets-Sheet 2

BY *Spencer & Kaye*

ATTORNEYS

United States Patent Office 3,551,799
Patented Dec. 29, 1970

3,551,799
MAINS VOLTAGE STABILIZING APPARATUS PROVIDING CONSTANT REACTIVE CURRENT
Floris Koppelmann, Berlin, Germany, assignor to Licentia Patent-Verwaltungs-G.m.b.H., Frankfurt am Main, Germany
Filed Mar. 24, 1969, Ser. No. 809,919
Claims priority, application Germany, Mar. 23, 1968, 1,763,018
Int. Cl. G05f 1/20
U.S. Cl. 323—8       15 Claims

ABSTRACT OF THE DISCLOSURE

Apparatus for stabilizing the voltage on a power supply mains having a load which draws varying amounts of reactive current. The apparatus includes an electrically variable inductance connected to the mains, either in series or in parallel with the load, and an electronic control circuit which regulates the instantaneous value of inductance of the variable inductance. The instantaneous value of inductance is chosen so that the reactive current drawn by the variable inductance will supplement the reactive current drawn by the load in such a way as to maintain the total reactive current drawn from the mains approximately constant.

BACKGROUND OF THE INVENTION

The present invention relates to apparatus for stabilizing the voltage on a power supply line on "mains."

It is known in the art to selectively connect and disconnect stages of capacitance or inductance, with the aid of fast operable electronic switches such as thyristors, for the low inertia compensation of the changing voltage drop or reactive current of variable loads. In general, inductive loads are compensated by capacitance while capacitive loads are compensated by inductance so that, in all of these prior art devices, the reactive currents of the loads are compensated by reactive currents of opposite phase.

SUMMARY OF THE INVENTION

An object of the present invention is to provide apparatus for stabilizing the voltage on a power supply mains having a load which draws a time-varying amount of reactive current.

This object, as well as other objects which will become apparent in the discussion that follows, is achieved, according to the present invention, by providing a viarable inductance either in series or in parallel with the load and an electronic control circuit for varying the inductance value of this variable inductance to maintain the total reactive current drawn from the mains approximately constant.

In contrast to the prior art, which teaches the technique of *compensating* the reactive current of a load by supplying reactive current of opposite phase, the apparatus according to the present invention is effective to maintain the reactive current of the load at an approximately constant value in spite of variations of the load.

When employed with an inductive load, the present invention may be realized, according to one preferred embodiment thereof, by connecting the variable inductance in series with the load and controlling the inductance value of the variable inductance so that the reactive current drawn by this series circuit will remain approximately constant in time. According to another preferred embodiment, the present invention is realized by connecting the variable inductance in parallel with the inductive load and regulating the variable inductance in such a way that its current will supplement the time-varying reactive current of the load to produce an approximately constant total reactive current.

The apparatus according to the present invention is therefore effective to cause the removal of an approximately constant value of reactive current from the power mains. If this constant value of reactive current is not desired, e.g., due to the resulting losses or loading of mains, it can either be partly or entirely compensated for, for example, by the well known expedient of connecting a suitably proportioned capacitor bank to the mains. This capacitor bank need not be of the type having a fast controlled variable capacitance since the fast variations of the reactive current of the load—i.e., the variations which are of comparable or higher frequency than the A.C. frequency of the mains—are compensated, according to the present invention, by the electronically switched variable inductance.

The apparatus according to the present invention for stabilizing the voltage on a power supply mains has the advantage, when compared to the reactive current compensating apparatus of the prior art, of substantially eliminating the danger of a short circuit. In contrast to the case when capacitors are used, if a mains voltage breakdown occurs with inductors, the current will not jump to values equivalent to the short circuit current of the mains.

BRIEF DESCRIPTION OF THE DRAWINGS

FIG. 1 is a schematic diagram of one preferred embodiment of the voltage stabilizing apparatus according to the present invention.

FIG. 2 is a schematic diagram of another preferred embodiment of the voltage stabilizing apparatus according to the present invention.

FIG. 3 is a schematic diagram of one preferred embodiment of the varible inductance according to the present invention.

FIG. 4 is a time diagram which illustrates the operation of the embodiment of the present invention shown in FIG. 2.

FIG. 5 is a circle diagram showing the voltage-current relationship of the load illustrated in FIG. 1, when operated at a constant voltage $U_0$.

FIG. 6 is a circle diagram showing the voltage-currrent relationship of the load illustrated in FIG. 1, when the voltage drop across the load is not a constant.

DESCRIPTION OF THE PREFERRED EMBODIMENTS

Figure 7:
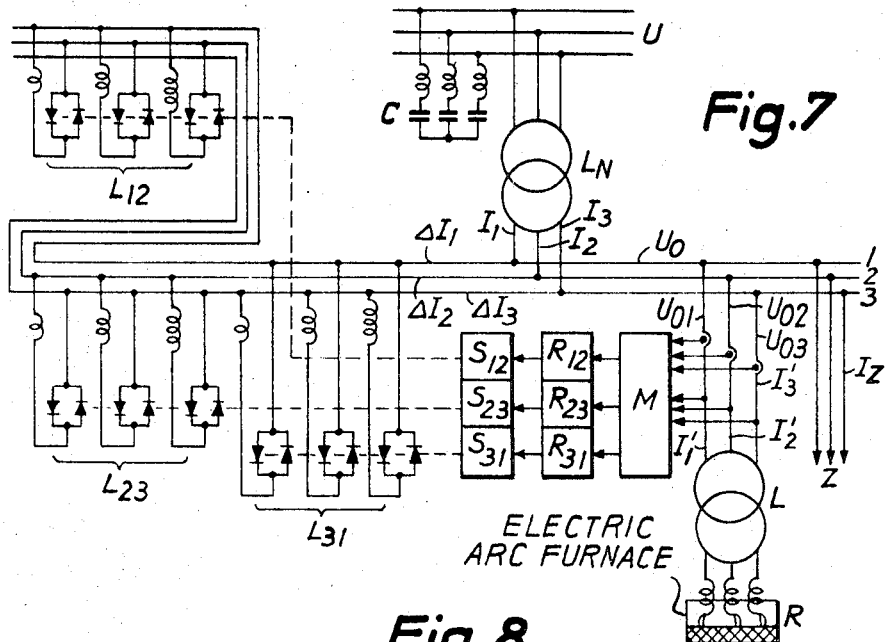
FIG. 7 is a schematic diagram of a polyphase network according to the preferred embodiment of the present invention illustrated in FIG. 2.

The preferred embodiments of the present invention will now be described with reference to the various figures of the drawings. FIG. 1 schematically shows a load having a resistance R and an inductance L connected to a mains of voltage $U_0$ through a variable inductance $\Delta L$. The resistance R of the load may vary in time with a high rate of change as may be the case, for example, with an electric arc furnace. If this load were to operate at a fixed voltage $U_0$, its current I load would vary in the manner shown in the circle diagram of FIG. 5; e.g., between the values $I_{01}$ and $I_{02}$. The resulting large variations $\Delta I_{\text{reactive}}$ of the reactive current component would produce large time variations in the voltage drop across the mains reactances $L_N$ and $R_N$ indicated in FIG. 1. These voltgae variations would, for example, result in a noticeable flickering of the electric lights.

It is possible to prevent these time variations in the voltage drop at the line reactances $L_N$ and $R_N$ by making variable the line reactance $L_N$ through the addition of a fast controllable variable reactance.

However, this technique would not relieve the power originating mains of voltage U from the varying reactive current so that its voltage U would vary as a result of the changing voltage drop at the reactance $L'_N$. In addition, the variable mains reactance $L_N$ would also have to carry the current of any additional loads P which operate at the voltage $U_0$ requiring a corresponding increase in its rated power. Finally, in the event of a short circuit of the mains voltage $U_0$, a very high voltage would appear across the variable mains reactance $L_N$ causing possible damage to its associated inductance-varying silia-con-controlled rectifier thyristors.

The apparatus according to the present invention which maintains approximately constant the reactive part of the current $I_N$, is free of these various disadvantages. In the embodiment shown in FIG. 1, a variable inductance $\Delta L$ is inserted in series with the load so as to carry only the current I load. If the voltage $U_0$ of the mains is short circuited (bypassing the load) the voltage across the variable inductance $\Delta L$ will be zero. In addition, by connecting the inductance $\Delta L$ ahead of the load $L/R$ it is effective to inhibit large short circuit load currents.

Since the voltage across the load will not be constant, due to the effect of the variable inductance $\Delta L$ that receives a portion of the constant voltage $U_0$, the circle diagram of FIG. 5 will no longer apply. If the variable inductance $\Delta L$ is regulated to maintain constant the reactive part of the current $I_{load}$, the relationship between the instantaneous value of resistance R and the required value of inductance $L+\Delta L$ will be as shown in the circle diagram of FIG. 6.

If the current scale is selected so that the diameter of the impedance circle simultaneously represents the reactive current $I_{reactive}$=constant, it is possible, given every value of resistance $R_1, R_2 \ldots$, to read not only the required inductance values L, $L+\Delta L \ldots$ from the diagram but to read also the currents $I_1, I_2 \ldots$ and the phase angles $\phi_1, \phi_2 \ldots$. If, for the largest possible value of resistance $R_1$ which will occur with the load, the inductance $\Delta L$ is set equal to zero, then at this operating point $\phi_1 = \phi_{01}$ and $I_1 = I_{01}$.

With falling resistance R the current will not increase as it did in the case of FIG. 5 but will decrease, e.g., to the value $I_2$. At $R=0$ it would be necessary to employ an inductance $\Delta L = \Delta L_S$, in order to keep the receive current constant. The short circuit current $I_S$ would then be substantially smaller than the short circuit current $I_{0S}$ of FIG. 5. In many practical cases it would suffice, however, to maintain the reactive currents constant between the two operating points 1 and 2 shown in FIG. 6.

By suppressing large short circuit-like reactive currents, the apparatus according to the present invention has an advantageous effect of the current losses of the power supply lines, input transformers, etc.; in addition, it prevents the occurrence of the undesirable electrodynamic forces which result from these large currents.

In many cases it will suffice to maintain the reactive current constant to within approximately 7%. In such event, it is possible to employ as the variable inductance three inductance stages $L_1, L_2$ and $L_4$ having an inductance ratio one to the other, of 1:2:4 as shown in FIG. 3. The inductance of this three-staged device can be varied in seven equal steps from the value of the smallest inductance stage $L_1$ to seven times this value (the total inductance value of the inductance stages $L_1, L_2$ and $L_4$) by appropriately firing the blocking thyristors. With such a device only $\frac{1}{14}$ of the reactive current must remain uncompensated.

The use of inductors in the apparatus according to the present invention in place of the compensating capacitors known in the prior art has the advantage that inductance may be regulated by synchronous non-oscillatory switching with a dead time of only a half cycle while the control of capacitors requires twice the dead time.

This is of special importance when eliminating light flicker since the human eye is able to notice voltage dips of very short duration if they occur at the rfequency of several Hz.

Compared to capacitors, inductors have the still further advantage of being less liable to produce dangerous resonant oscillations, particularly when used in conjunction with an electric arc since the latter effectively serves as a source of oscillations.

As indicated in FIG. 4 the controllable rectifiers (thyristors) must be fired when the inductor voltage reaches a maximum or peak value in order to avoid transients in the inductors.

The firing voltage should be maintained on the respective thyristors for as long as they are to remain in the conductive state. When the firing voltage is removed, the thyristors will continue to conduct until the current that passes through them next falls to zero. In the example illustrated in FIG. 4, the firing voltage is applied to the thyristors at time $t_1$ and removed during the half-cycle just prior to the time $t_2$. At $t_2$ the inductor current $I_{\Delta L}$ passes through zero and the thyristor is rendered non-conductive.

The embodiment of the present invention illustrated in FIG. 1, wherein the variable inductance is arranged in series with the load, is especially advantageous when it is necessary to prevent possible short circuit-like loading of the power mains as is the case, for example, with electric arc furnaces, arc welding machines and the like. It can also be used to limit short circuit currents in general power supply mains or mains junction points while offering simultaneously the additional possibility of controlling the voltage or distributing the load.

In accordance with a second preferred embodiment of the present invention the variable inductance $\Delta L$ is connected in parallel to the load as shown in FIG. 2. In this case the inductance is controlled by supplementing the varying reactive currents of the load in synchronism with the periodicity of the mains voltage in such a way as to eliminate the variations in the mains voltage. The disadvantage of relatively large, (i.e., short circuit-like) mains currents which are made possible with this embodiment is at least in part outweighed by the protection afforded the variable inductance $\Delta L$. Neither the coils nor the controllable rectifiers of the variable inductance can ever receive an over voltage or over current, even upon short circuit of the load ($R=0$). With this embodiment, the separate inductance stages $L_1, L_2$ and $L_4$ should be connected in parallel with the thyristors in series with each inductor.

FIG. 7 schematically illustrates an entire system according to the present invention for stabilizing a mains supply voltage U. The load in this case is an electric arc furnace which exhibits a time varying resistance R. This arc furnace is connected to a supply mains of voltage $U_0$ via a suitable power transformer so that the load may be viewed as the constant transformer inductance L and the varying resistance R. The mains supply of voltage $U_0$ is connected, in turn, to the master mains supply of voltage U via a transformer having a stray reactance $L_N$. Additional loads Z, which carry a current $I_Z$, can also be connected to operate from the mains $U_0$.

Figures 9A, 9B, 9C:
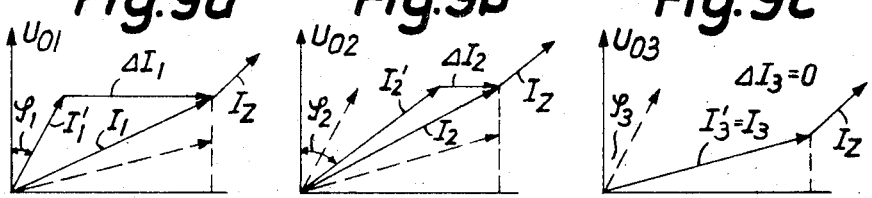
FIGS. 9a, 9b, and 9c are circle diagrams showing exemplary voltage-current relationships for the three respective phases of the load illustrated in the apparatus of FIG. 7.

With varying rescistance R and a constant inductance L the load current will vary in the manner illustrated by the circle diagrams of FIGS. 9a, 9b and 9c; for example, between the values illustrated for $I'_1$ which is the current on phase 1, $I'_2$ which is the current on phase 2, $I'_3$ which is the current on phase 3, and their respective phase angles $\phi_1, \phi_2$ and $\phi_3$.

The variations in the reactive parts of each of these currents will cause variations in the mains voltage $U_0$. These variations in the mains voltage $U_0$ are eliminated according to the present invention, by providing each pair of phases with a respective thyristor controlled variable inductance $L_{12}$, $L_{23}$ and $L_{31}$. Each inductor of each variable inductance is connected in series with an anti-parallel thyristor set which is operated in such a way as to supplement the varying currents—in particular, the varying reactive currents—of the load or loads so that an approximately constant current will be drawn from the mains.

This supplementation of current is preferably effected with a time delay of only one or even one-half A.C. period. In order to achieve this fast response, the current $I'_1$, $I'_2$ and $I'_3$ and the voltage $U_{01}$, $U_{02}$ and $U_{03}$ of each phase of the load is sampled every period or every half period and a fast electronic calculator employed determines how large should be the inductances $L_{12}$, $L_{23}$ and $L_{31}$ to maintain the mains voltage $U_0$ as nearly constant as possible. If the load is symmetrical—i.e., of the type which applies an equal load resistance to all three phases of the mains—the variable inductances $L_{12}$, $L_{23}$ and $L_{31}$ should be operated to supplement the reactive current of the load in every period or half period so that the total reactive current will lie at the substantially constant value equal to the maximum value of reactive current which can occur with the load. If the load is of the type applying an unsymmetrical load to the three phases of the mains, the symmetry can be restored by a suitable choice of variable inductances $L_{12}$, $L_{23}$ and $L_{31}$. This is realizable, with the apparatus illustrated in FIG. 7, employing an individual calculator $R_{12}$, $R_{23}$ and $R_{31}$ for each of the three phase pairs to operate the individual thyristor-control circuits $S_{12}$, $S_{23}$ and $S_{31}$ and the variable inductances $L_{12}$, $L_{23}$ and $L_{31}$, respectively.

Figure 8:
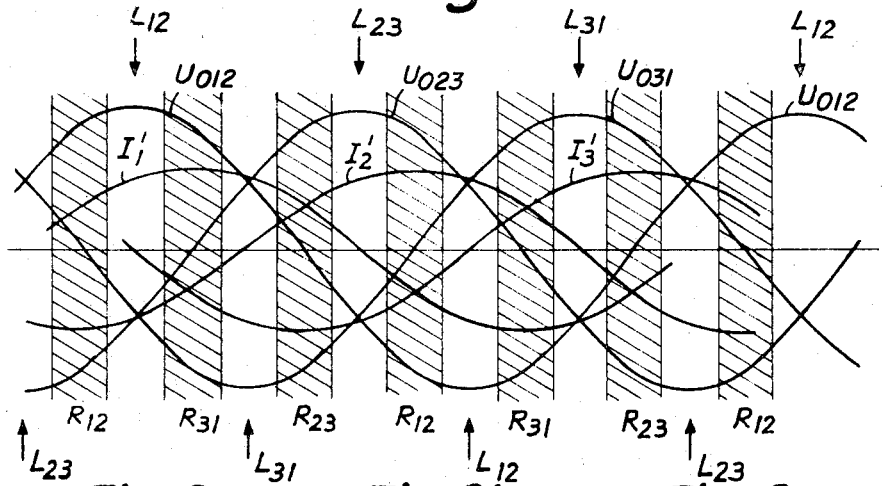
FIG. 8 is a time diagram which illustrates the operation of the apparatus of FIG. 7.

The operation of the circuit of FIG. 7 is illustrated in the time diagram of FIG. 8. For the sake of the simplicity it is assumed, for the purposes of FIG. 8, that the mains are provided with a symmetrical load so that the load currents $I'_1$, $I'_2$ and $I'_3$ are of constant phase relationship with respect to each other and of equal magnitude.

During each of the time periods, indicated in FIG. 8 by the shaded areas, the instantaneous values of the current and voltage of the load are sampled by a measuring device M. The measured information is then transformed according to the Steinmetz formula, separately for each phase, by the calculators $R_{12}$, $R_{23}$ and $R_{31}$ to control the respective variable inductances $L_{12}$, $L_{23}$ and $L_{31}$.

If transients are not to appear in the mains when the inductances are switched, the switching should always take place when the voltages $U_{012}$, $U_{023}$ and $U_{031}$ are at their respective peak values. The sampling of voltages and currents of the three phases should take place as shortly before the occurrence of these peak values as possible so that fast variations of the load will be compensated by the variable inductances. In FIG. 8, for example, the shaded sampling region in every case lies only approximately 60° ahead of the switching times of the respective inductances $L_{12}$, $L_{23}$ and $L_{31}$.

FIGS. 9a, 9b and 9c illustrate the operation of the invention for the case where the currents in the three phases of the load are different both in magnitude and phase angle. In phase 1 the load current $I'_1$ is at the minimum accepted by the load while in the phase 3 current $I'_3$ is at the maximum possile value. Supplementary current $\Delta I$ is therefore required in phase 1 but not in phase 3. By suitable choice of the inductances in $L_{12}$, $L_{23}$ and $L_{31}$, an additional reactive current $\Delta I_1$ is added to the phase current $I'_1$ to produce a resultant current $I_1$ having substantially the same reactive part as the current $I'_1 = I'_3$. A supplementary current $\Delta I_2$ is also added in the phase 2 (FIG. 9b) which supplies the load with a current $I'_2$ of intermediate value.

As a result of voltage drops at the ohmic line resistances of the mains due to the real components of the currents, the compensation should not be such as to make the re-active current components in each phase *exactly* equal; rather the compensation should deviate somewhat from this theoretical ideal in order also to stabilize these ohmic voltage drops and achieve a constant mains voltage.

Each phase pair, in the circuit of FIG. 7, is provided with three switchable coils having inductances which, for example, can exhibit an inductance ratio, one to the other, 1:2:4. By connecting the three coils in the various possible combinations, each of the variable inductances $L_{12}$, $L_{23}$ and $L_{31}$, respectively, can be made to assume seven different inductance values.

If the reactance $L_N$ of the originating supply mains U is relatively large in comparison to the inductance L of the variable load, it may be practical to comprise the variable inductances across each phase pair of four separate coils having inductance values in a ratio, for example of 1:2:48. Such an arrangement would make it possible to vary the inductance, applied across each phase pair in 17 equal steps.

Under certain circumstances it may be practical to connect the variable inductances to the power mains at a time not exactly coincident with—that is, either somewhat sooner or somewhat later than—the moments of peak value of the voltage. The transients which will then occur, and which decay only slightly during the A.C. half period, will not disturb the operation of the apparatus. This technique has the advantage, on the other hand, that it generates additional latitude to achieve fast compensation of sudden variations of the load current. The varying load current in the circuit of FIG. 7 should be supplemented by the current through the selectively connected coils of the variable inductances so that the total current will remain approximately equal to the highest value of load current that is likely to occur. However, this operation has the effect of continuously loading the mains with a high value of reactive current. In order to compensate this reactive current capacitors C can be connected either to receive the voltage $U_0$ or, as shown in FIG. 7, the voltage U. If necessary, addition inductances can also be added, as shown, to form resonant circuits.

It will be understood that the above description of the present invention is susceptible to various modifications, changes and adaptations.

I claim:
1. Apparatus for stabilizing the voltage on a power supply mains to which is connected a load that operates with a fast varying reactive current comprising, in combination:
   (a) electrically variable inductance means connected to said mains; and
   (b) electronic circuit means for controlling the inductance of said variable inductance means for maintaining approximately constant the reactive current obtained from said mains.

2. The apparatus defined in claim 1, wherein said variable inductance means is connected in series with said load.

3. The apparatus defined in claim 1, wherein said variable inductance means is connected in parallel with said load.

4. The apparatus defined in claim 1, wherein said circuit means is responsive to changes in the reactive current obtained from said means.

5. The apparatus defined in claim 1, said circuit means is responsive to changes in the total current obtained from said means and controls said inductance of said variable inductance means for maintaining approximately constant the voltage drop at the inductance and ohmic resistances of said mains.

6. The apparatus defined in claim 1, wherein said variable inductance means includes a plurality of coils and an electronic switch means associated with each of said coils, for selectively connecting the associated one of said coils to said mains in synchronism with the periodicity of the voltage on said mains.

7. The apparatus defined in claim 6, wherein each of said switch means includes at least two anti-parallel connected controllable rectifiers.

8. The apparatus defined in claim 6, wherein said plurality of coils are arranged in series.

9. The apparatus defined in claim 6, wherein said plurality of coils are arranged in parallel.

10. The apparatus defined in claim 6, wherein there are three coils having inductances in the ratio, one to the others, of 1:2:4.

11. The apparatus defined in claim 7, wherein said load is partially inductive and draws a fast varying and irregular inductive current, wherein said variable inductance means is connected in parallel with said load and wherein said electronic circuit means controls each of said switch means for connecting selected ones of said coils to said mains at least once each mains voltage period, thereby to supplement said varying inductive current of said load so that the total inductive current drawn from, and the voltage on, said mains will remain approximately constant.

12. The apparatus defined in claim 11, wherein said load is an electric arc furnace.

13. The apparatus defined in claim 11, wherein said electronic circuit means connects selected ones of said coils to said mains at each half period of said mains voltage.

14. The apparatus defined in claim 11, wherein said electronic circuit means includes means for periodically sampling the instantaneous values of load voltage and load current and means, responsive to said values of load voltage and load current, for calculating the value of inductance of said variable inductance means required for maintaining said total inductive current approximately constant.

15. The apparatus defined in claim 14, wherein said mains has a plurality of phases, wherein said load applies an unsymmetrical load to said phases, wherein said variable inductance means includes a plurality of separate variable inductances, each connected to one of said phases, and wherein said calculating means include a plurality of separate calculators, each of which is associated with one of said separate variable inductances, for controlling said one separate variable inductance.

References Cited

UNITED STATES PATENTS

| | | | |
|---|---|---|---|
| 3,193,758 | 7/1965 | Friedlander | 323—60 |
| 3,264,552 | 8/1966 | Anderson et al. | 323—83X |
| 3,431,344 | 3/1969 | Borrebach | 13—12 |

J D MILLER, Primary Examiner

G. GOLDBERG, Assistant Examiner

U.S. Cl. X.R.

13—12; 219—131; 323—60, 79, 81, 127